US007134650B2

(12) United States Patent
Trudel et al.

(10) Patent No.: US 7,134,650 B2
(45) Date of Patent: Nov. 14, 2006

(54) PRECISION VISE

(75) Inventors: Daniel Trudel, Notre dame du mont Carmel (CA); Frederic Tremblay, Trois-Rivieres (CA)

(73) Assignee: Fablock, Inc., Trois-Rivieres (CA)

( * ) Notice: Subject to any disclaimer, the term of this patent is extended or adjusted under 35 U.S.C. 154(b) by 4 days.

(21) Appl. No.: 10/873,249

(22) Filed: Jun. 23, 2004

(65) Prior Publication Data

US 2005/0023741 A1 Feb. 3, 2005

Related U.S. Application Data

(60) Provisional application No. 60/480,260, filed on Jun. 23, 2003.

(51) Int. Cl.
*B23Q 3/02* (2006.01)

(52) U.S. Cl. ........................................ 269/138; 269/43

(58) Field of Classification Search ................ 269/138, 269/137, 157, 217, 43, 45
See application file for complete search history.

(56) References Cited

U.S. PATENT DOCUMENTS

| | | | | | |
|---|---|---|---|---|---|
| 3,630,512 | A | * | 12/1971 | Paret | 269/48 |
| 4,295,641 | A | * | 10/1981 | Boucher | 269/136 |
| 4,345,750 | A | * | 8/1982 | Glaser | 269/136 |
| 5,735,513 | A | * | 4/1998 | Toffolon | 269/43 |
| 6,126,158 | A | * | 10/2000 | Engibarov | 269/136 |

* cited by examiner

*Primary Examiner*—Lee D. Wilson
(74) *Attorney, Agent, or Firm*—Hoffman, Wasson & Gitler, P.C.

(57) ABSTRACT

A vise has a jaw connected to a jaw support has a recess formed in a rear surface. A biasing member in the recess applies a force to the recess having a downward component to secure a workpiece to the vise. The biasing member may be the end of a set screw, a ball bearing or cam. The recess may be provided with an inclined surface to allow a horizontal force to be converted into a force having a vertical component.

7 Claims, 7 Drawing Sheets

PRECISION VISE

This application claims the benefit of provisional application 60/480,260, filed Jun. 23, 2003.

FIELD OF THE INVENTION

The invention relates to a precision vise.

BACKGROUND OF THE INVENTION

Precision vises are known in the art. A typical precision vise, depicted in FIG. 1, comprises two jaws 3, 5 slidably mounted onto corresponding jaw supports 7, 9. One jaw support is fixed to the base 11 and the other jaw support moves with respect to the base 11 by being connected to a moveable support base 13.

When the two jaws are brought onto a workpiece, the jaws are tightened by movement of a lead screw 15. Pressure is applied by the jaw 5 onto the workpiece which in turn applies pressure to the other jaw 3. Lateral movement of the support 7 causes inclined sliding movement of the jaws 3, 5 holding the workpiece to the vise base in a fixed and secure manner. Often, a first tool is required to move the moveable jaw support base 13 and a second tool to operate the lead screw 15. The jaws rely upon the principles of the base planes between supports 7, 9 and jaws 3, 5. The planes may become wedged due to torsion and render the vise inoperable or require extensive maintenance and part replacement.

There is a need in the art for a precision vise having an improved mechanism for moving the jaws with respect to their supports to clamp the workpiece onto the vise base and moving the support base relative to the vise base.

It is an object of the invention to provide a precision device having a base, a fixed support holding a first jaw and a moveable support having a second jaw.

It is another object of the invention to provide a jaw having inclined surface acted upon by the support to produce horizontal and vertical force.

It is another object of the invention to provide a moveable support base moving the moveable jaw without the use of tools.

It is yet another object of the invention to provide a precision vise applying lateral and vertical force to the workpiece to secure the workpiece to the vise base. These and other objects of the invention will become apparent to one of ordinary skill in the art after reading the disclosure of the invention.

SUMMARY OF THE INVENTION

A vise has a jaw connected to a jaw support has a recess formed in a rear surface. A biasing member in the recess applies a force to the recess having a downward component to secure a workpiece to the vise. The biasing member may be the end of a set screw, a ball bearing or cam. The recess may be provided with an inclined surface to allow a horizontal force to be converted into a force having a vertical component.

DETAILED DESCRIPTION OF THE INVENTION

Figure 1:
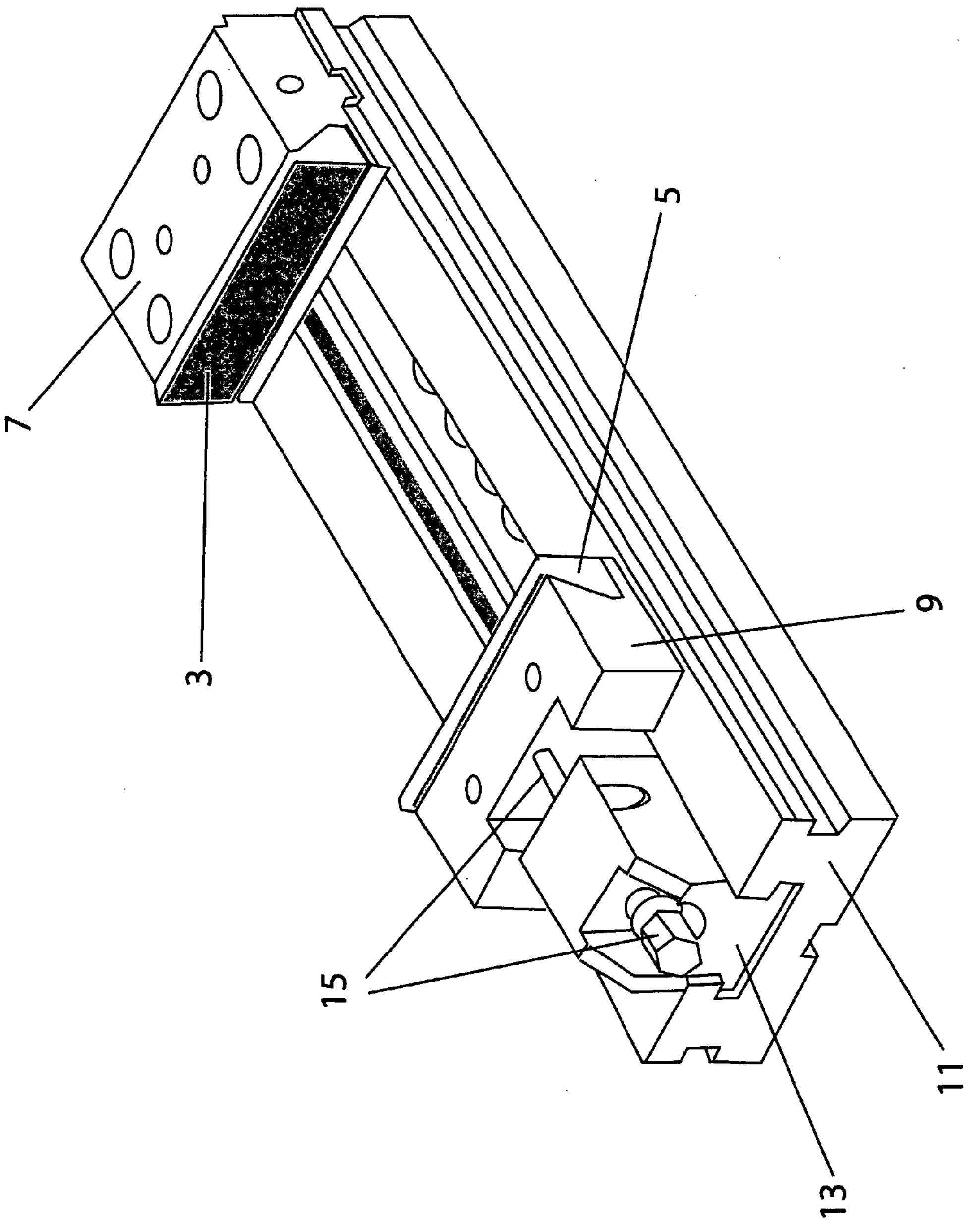
Figure 1 PRIOR ART
FIG. 1 is a perspective view of a prior art vise.
Figure 2:
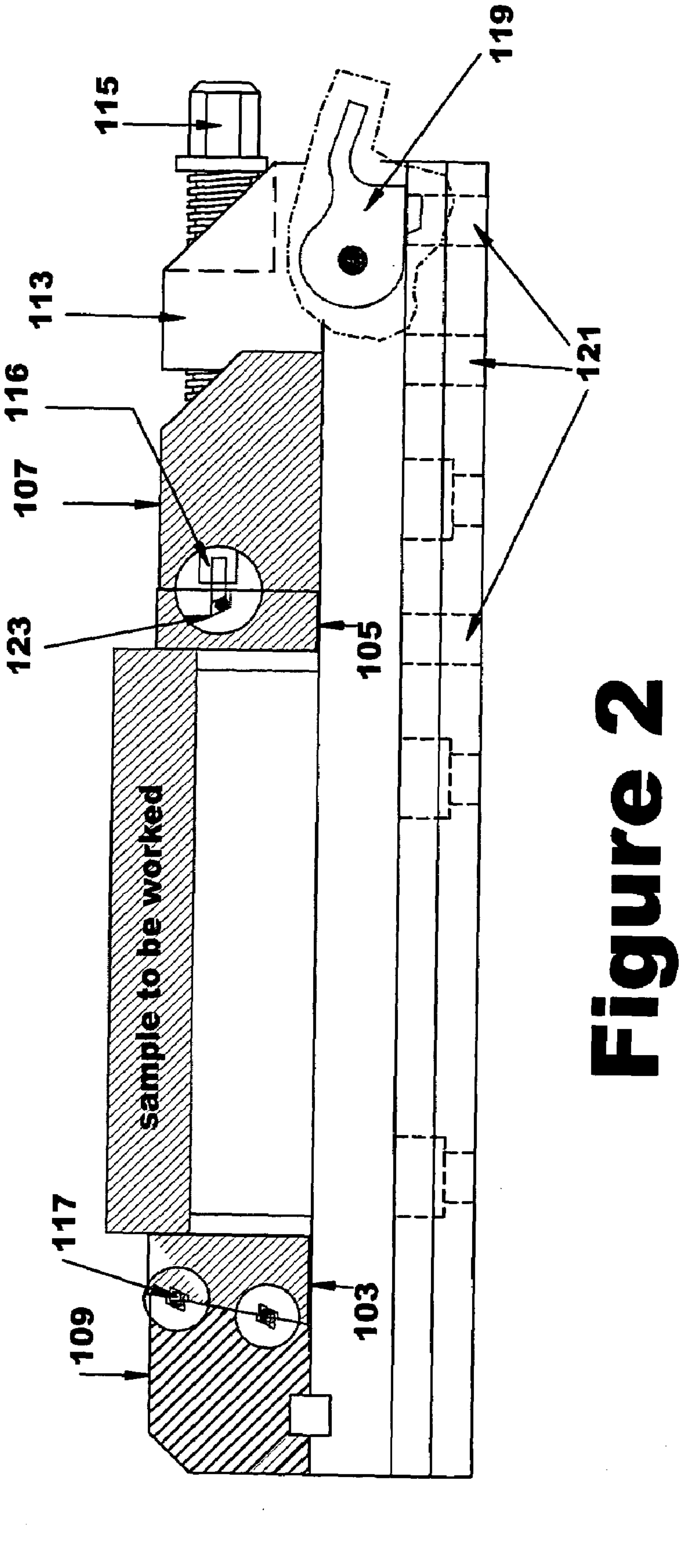
FIG. 2 is a cross section of the vise holding a workpiece.

FIG. 2 shows the vise of the invention acting upon a sample placed between the two jaws, 103, 105. Stationary jaw 103 is mounted on stationary support 109. Likewise, moveable jaw 105 is attached to movable support 107. Both the movable jaw and support are attached to support base 113. Support base 113 slides along base 111 and has a rocking latch 119 pivotally attached. To use the vise, the support base 113 moves along the base 111, thereby moving moveable support 107 and moveable support jaw 105 into contact with the sample. To move the support base 113, rocking latch 119 is pivoted upwardly and the support base slid forward. When in contact with the sample to be held, the rocking latch is released and a projection of the rocking latch engages one of the aperture 121 formed in the base. In this manner, the jaw 107 is moved into the correct position easily and without the necessity of any tools. Some of the apertures 121 have enlarged upper portions for receiving suitable fasteners, such as hallen cap screws, allowing for the securement of the base 111 to any suitable support structure.

Once in contact with the sample to be worked, pressure can be applied to the jaws 103, 105 to securely lock the sample to the vise. The moveable jaw 105 has a recess 123 terminating in an inclined surface. When force is applied against the inclined surface, the force has both a horizontal and vertical component. The horizontal component works against the sample and the vertical component acts to force the jaw downwardly. In the vise depicted of FIG. 2, a needle bearing 116 is at the terminal end of the set screw 115. When the set screw 115 is advanced by rotation, the needle bearing acts against the inclined surface of the recess in the moveable jaw.

Pressure applied against the sample by the moveable jaw 105 is transferred, by the sample, to the fixed jaw 103. The fixed jaw 103 has a pair of recesses, each with an inclined surface. The fixed support 109 has a corresponding pair of recesses. The recesses inside the jaws 103, 105 and corresponding supports 107, 109 are preferably formed with the combined angle of 15°. Within the recesses are ball bearings 117. Pressure applied against the fixed jaw 103 by the sample causes the ball bearing 117 to act upon the inclined surface of the recess. In a manner similar to the inclined surface of the moveable jaw 105, the applied force is split into two components, having a horizontal and vertical component. The vertical component lowers the jaw 103 to secure the sample to the base of the vise.

Figure 3:
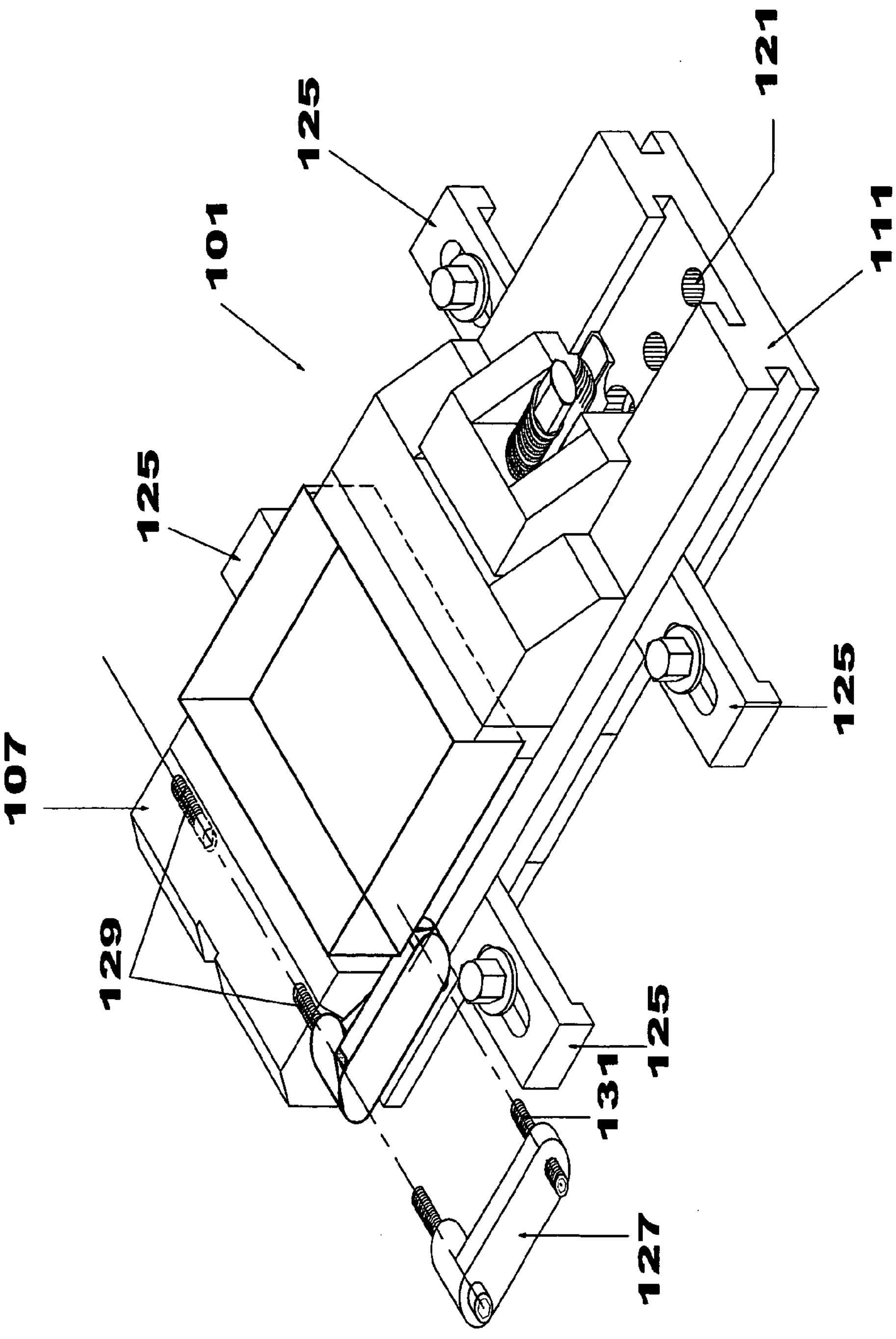
FIG. 3 is a perspective view of the vise having clamps and an abutment flange.

FIG. 3 shows the vise secured to a support by brackets 125 engaging grooves in the side of the base 111. The brackets 125 have slots receiving a fastener engaging a support surface. This may be done in addition to or instead of fasteners extending through the enlarged apertures 121 in the center of the base 111. Also seen is the abutment flange 127 secured to threaded apertures 129 in the fixed support 107. The abutment flange 127 has adjustable tab 131 movable relative to the abutment flange 127. When set, the adjustable tab 131 allows the quick, repeated and precise location of work pieces within the vise.

Figure 4:
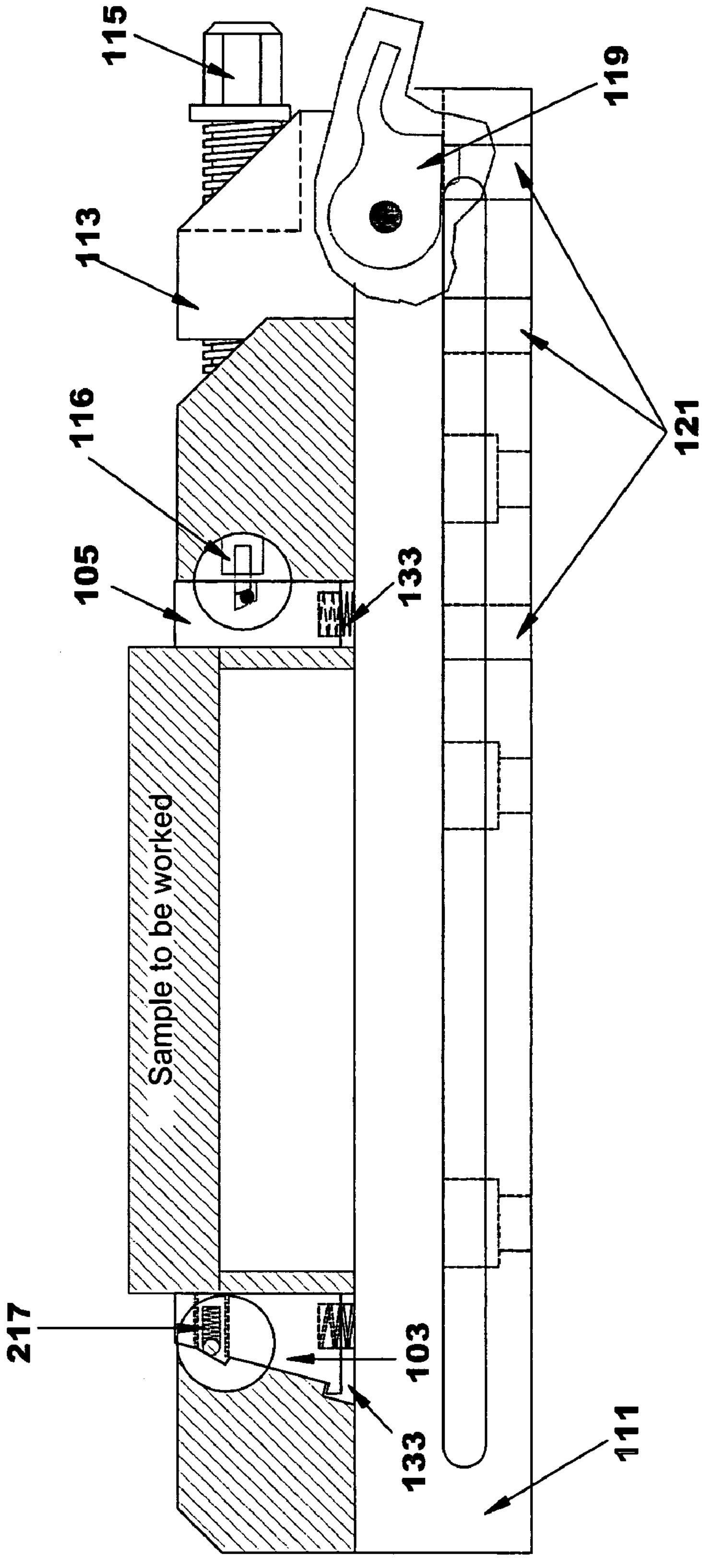
FIG. 4 is a cross section view of a second embodiment of the vise.

FIG. 4 shows a second embodiment of the precision vise. In this embodiment, the ball bearing 117 are replaced with spring loaded ball plungers 217. Also in this embodiment, the jaws 103, 105 are supported upon springs 133 extending between the bottom of the jaw and the base 111.

Figure 5:
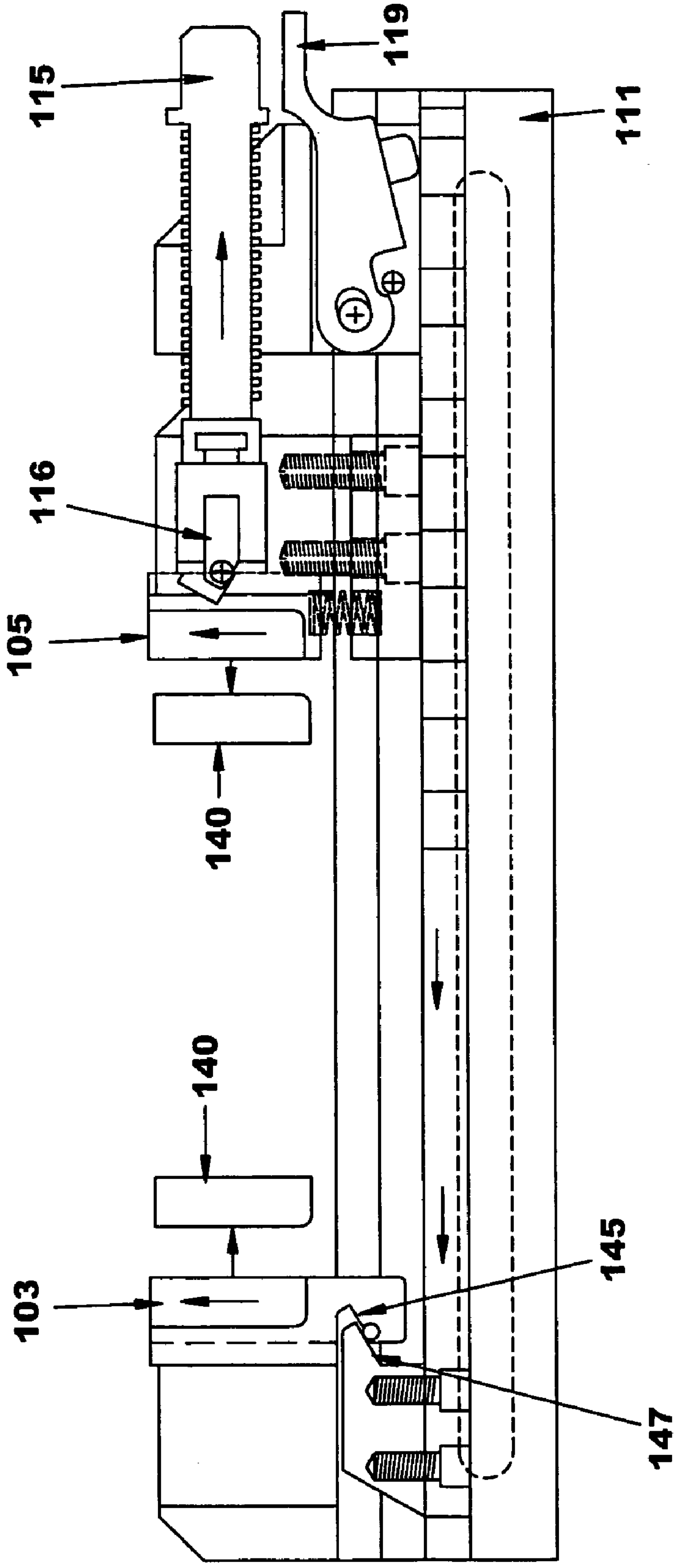
FIG. 5 is a detailed view of the connection between the movable support and jaw and a third embodiment of the fixed support and jaw.

FIG. 5 shows a clear view of the needle bearing 116 at the end of lead screw 115 acting upon the inclined surface of the recess 123. In this third embodiment, the fixed and movable jaws are provided with interchangeable contact surfaces 140 chosen to suit the sample to be worked. The fixed jaw is provided with a recess having an inclined surface 145 and the fixed support has a projection having a mating incline surface 147. Pressure applied to the fixed jaw 103 causes the two surfaces to impinge upon one another with the resulting force having both a vertical and horizontal component resulting in the downward movement of the fixed jaw.

Figure 6:
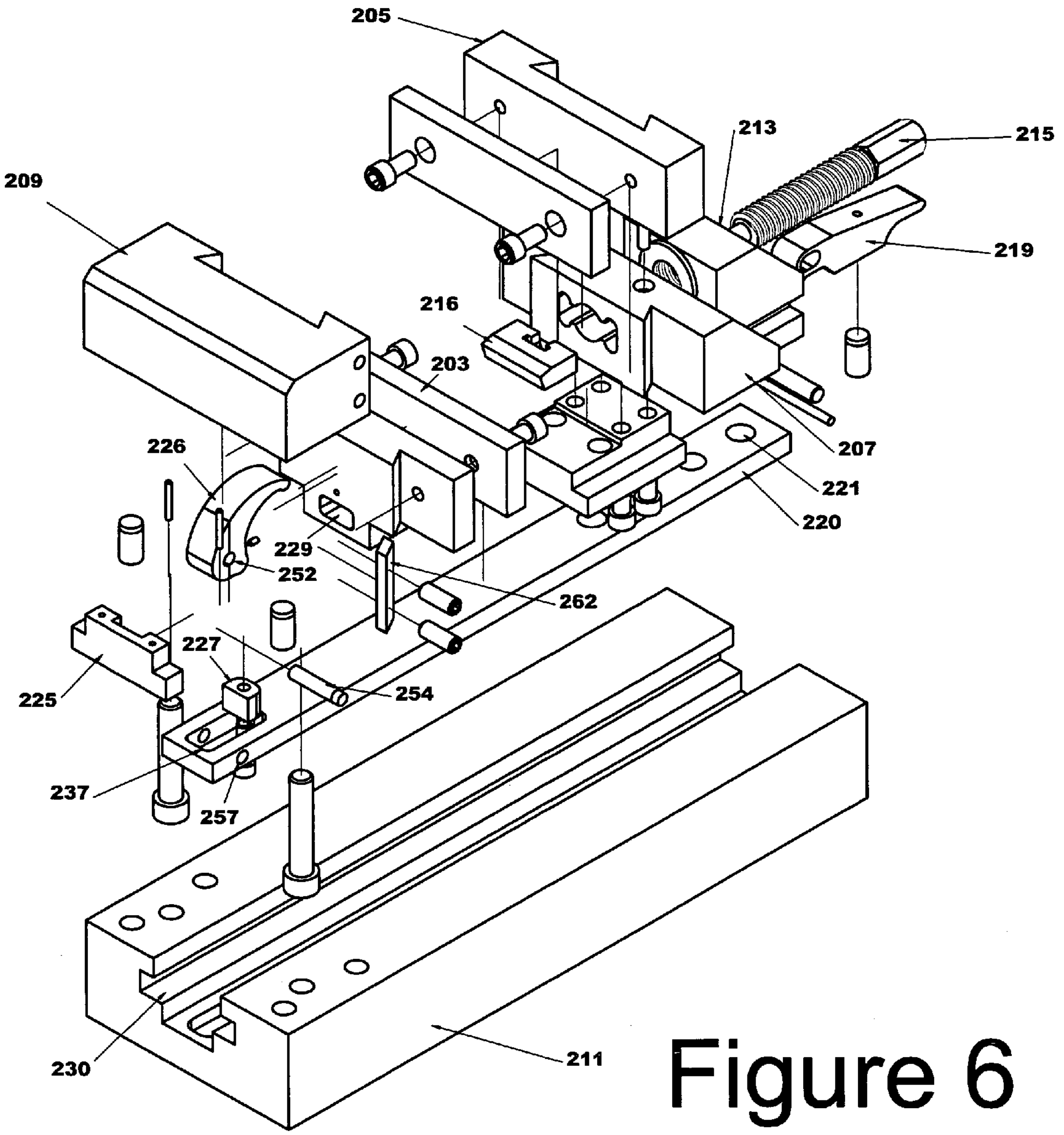
FIG. 6 is a cross section of the fourth embodiment of the vise.

The exploded view of the fourth embodiment is shown in FIG. 6. The base 211 has a groove 230 receiving link 220. A stop 225 closes the end of the groove 230. Formed within link 220 are apertures 221, preferably spaced apart by a distance of 2 inches. Support base 213 houses latch 219 having a projection selectively engaging one of the apertures 221. The latch 219 secures the support base to the link 220. Support base 213 also has lead screw 215 terminating in a block 216 acting on an inclined surface of a recess in jaw 205, similar to the earlier embodiment. Support base 213 is connected to moveable support 207 and moveable jaw 205 connects to the moveable support by a dovetail connection.

The fixed jaw support 209 retains the fixed jaw 203 by another dovetail support. A shim may be placed in the dovetail connection and adjusted by screws 265 extending though the side of jaw support 209. Within the rear face of the fixed jaw is aperture 229. The arm of cam 226 fits within the recess 229 as will be explained later. The end of link 220 has a slot 237. Pin 254 extends though aperture 257 and aperture 252 of cam 226 to retain the cam within the slot. Block 227 extends through the slot 237 and is firmly attached to the base 211.

Figure 7:
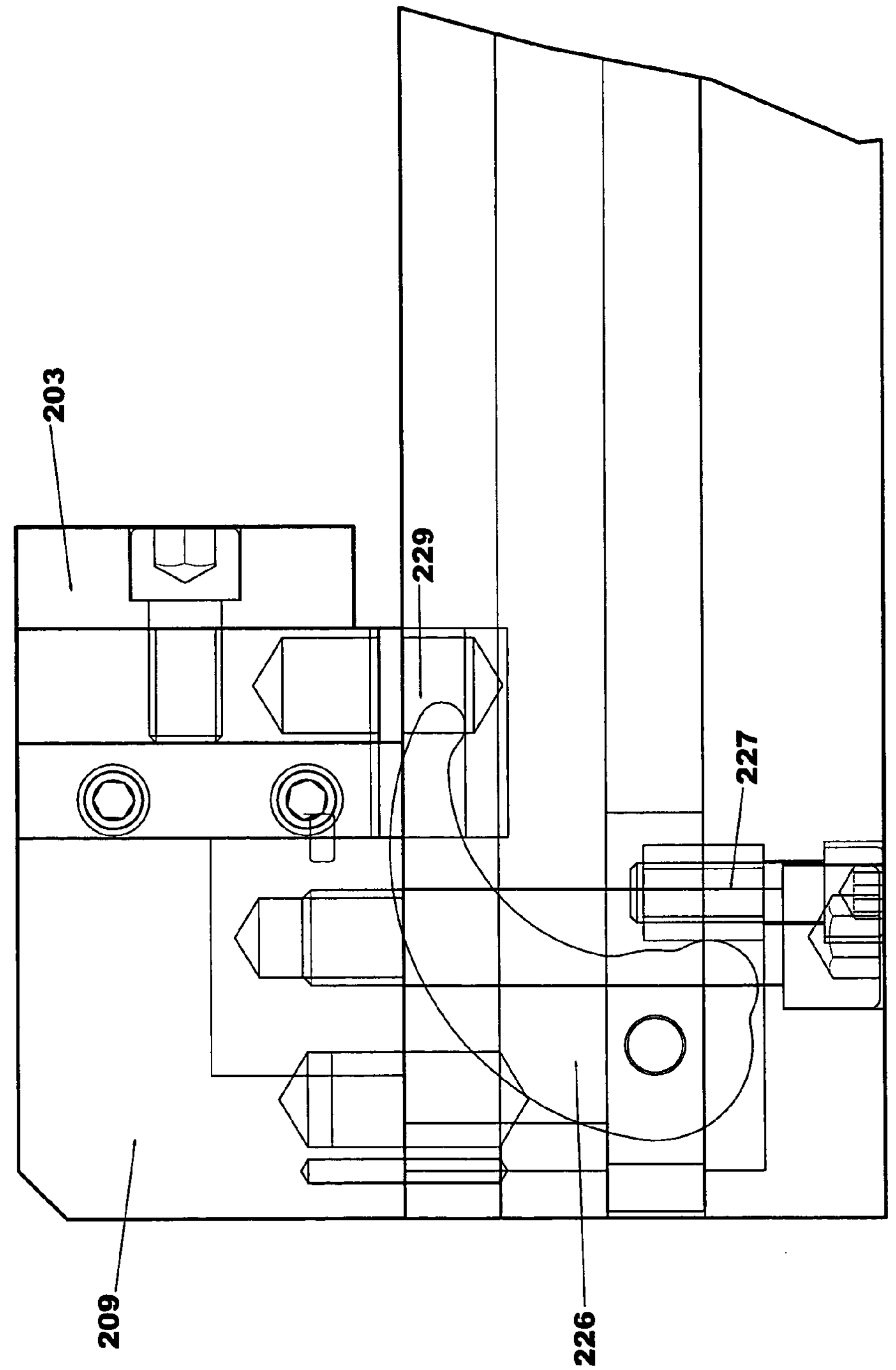
FIG. 7 is a cross sectional view of the connection between the fixed support and jaw.

FIG. 7 shows the interaction of the block 227, cam 226 and recess 229 in order to generate a downward force for the fixed jaw 203. After support base 213 is slid forward and the latch 219 engages an aperture 221, the link 220 and support base move together. When the moveable jaw 205 is moved by rotation of the set screw 215, it engages a work piece or the fixed jaw. Resistance supplied by the work piece or fixed jaw causes the support base 213 to move away from the movable jaw upon further rotation of the set screw. The link 220 then slides to the right causing the cam 226 to contact the block 227. The pressure applied by the block 227 causes clockwise rotation of the cam. The cam arm extending into recess 229 applies a downward pressure against the stationary jaw 203. The moment arm created by the length of the cam allows a significant amount of force to be applied to the stationary jaw. In a preferred embodiment, ten percent of the force generated by the vise is translated into the vertical component.

While the invention has been described with reference to preferred embodiments, variations and modification would be apparent to one of ordinary skill in the art without departing from the scope of the invention. For instance, the jaws having removable contact surfaces can be used with any embodiment.

We claim:

1. A vise, comprising:
a base
a first jaw support on said base,
a first jaw attached to said first jaw support, said first jaw having a front face and a rear face, a recess in said rear face,
a second jaw support on said base,
a second jaw attached to said second jaw support, said second jaw having a front face and a rear face, a second recess in said rear face,
a first biasing member in said first jaw recess, said first biasing member applying a downward force on said first jaw,
a second biasing member in said recess of said second jaw, said second biasing member applying a downward force on said second jaw,
wherein
said first jaw support is fixed to said base,
said second jaw support is attached to a support base, said support base movable along said base,
a latch attached to said support base,
a series of apertures in said base, said latch engaging one of said apertures to secure said support base to said base.

2. A vise, comprising:
a base
a first jaw support on said base,
a first jaw attached to said first jaw support, said first jaw having a front face and a rear face, a recess in said rear face,
a second jaw support on said base,
a second jaw attached to said second jaw support, said second jaw having a front face and a rear face, a second recess in said rear face,
a first biasing member in said first jaw recess, said first biasing member applying a downward force on said first jaw,
a second biasing member in said recess of said second jaw, said second biasing member applying a downward force on said second jaw,
further comprising:
a groove in said base,
a link slidable received in said groove, said link having at least one aperture at one end and a slot at the other end,
a cam pivotally retained in said slot, said cam having an arm extending in said first cam recess,
said second jaw support engaging said at least one aperture in said link so that movement of said second jaw support causes movement of said link, and
a block extending through said slot and secured to said base.

3. The vise of claim 2, wherein
said second jaw engages said at least one aperture by being attached to a support base,
a latch connected to said support base and having a projection engaging said at least one aperture.

4. The vise of claim 3, wherein
said latch is pivotally connected to said support base.

5. A vise, comprising:
a base
a first jaw support on said base,
a first jaw attached to said first jaw support, said first jaw having a front face and a rear face, a recess in said rear face,
a second jaw support on said base, a second jaw attached to said second jaw support, said second jaw having a front face and a rear face, a second recess in said rear face, a first biasing member in said first jaw recess, said first biasing member applying a downward force on said first jaw, a second biasing member in said recess of said second jaw, said second biasing member applying a downward force on said second jaw, further comprising:

a groove in said base, a link slidably received in said groove, said link connected to said second jaw support, a cam having an arm extending into said recess of said first jaw, wherein movement of said second jaw support causes rotation of said cam through said link, rotation of said cam causing a downward force to be applied to said first jaw.

6. A vise, comprising:

a base a first jaw support on said base, a first jaw attached to said first jaw support, said first jaw having a front face and a rear face, a second jaw support on said base, a second jaw attached to said second jaw support, said second jaw having a front face and a rear face, a first biasing member in said first jaw support, said first biasing member applying a downward force on said first jaw causing downward movement of said first jaw, a second biasing member in said second jaw support, said second biasing member applying a downward force on said second jaw causing downward movement of said second jaw further comprising:

a first recess in said first jaw rear face, said first recess having an inclined surface, wherein said first biasing member applies force against said inclined surface.

7. The vise of claim 6, wherein said first biasing member is a ball bearing or spring loaded ball plunger.

* * * * *